United States Patent [19]
Nesbitt et al.

[11] 3,856,496
[45] Dec. 24, 1974

[54] GLASS MELTING FURNACE AND PROCESS

[75] Inventors: John D. Nesbitt, Chicago; Dennis H. Larson, Bridgeview; Mark E. Fejer, Chicago, all of Ill.

[73] Assignee: Leone International Sales Corporation, Bridgeton, N.J.

[22] Filed: Jan. 26, 1973

[21] Appl. No.: 326,593

[52] U.S. Cl. ............ 65/29, 65/134, 65/135, 65/136, 65/158, 65/160, 65/346
[51] Int. Cl. .................. C03b 5/00, C03b 5/24
[58] Field of Search .......... 65/135, 337, 134, 347, 65/136, 346, 335, 99 A, 158, 160

[56] References Cited
UNITED STATES PATENTS

| | | | |
|---|---|---|---|
| 3,142,553 | 7/1964 | Cook | 65/304 |
| 3,475,151 | 10/1969 | Briggs et al. | 65/135 X |
| 3,515,529 | 6/1970 | Love et al. | 65/136 X |
| 3,573,017 | 3/1971 | Grienn | 65/135 X |
| 3,592,622 | 7/1971 | Shepherd | 65/136 X |
| 3,592,623 | 7/1971 | Shepherd | 65/135 |
| 3,615,333 | 10/1971 | Lawrenson et al. | 65/182 R |
| 3,658,501 | 4/1972 | Lawrenson et al. | 65/99 A X |
| 3,721,544 | 3/1973 | Bystrianyk et al. | 65/304 X |

Primary Examiner—S. Leon Bashore
Assistant Examiner—Kenneth M. Schor
Attorney, Agent, or Firm—Darby & Darby

[57] ABSTRACT

There is disclosed a process and apparatus for use with a glass-melting furnace having a melting zone and a refining zone separated by a bridge wall. Two pairs of burners are mounted in a wall of the furnace for melting the raw batch material within the melting zone of the furnace. The angle between the two burners of each pair of burners is adjusted to increase the mixing of fuel and combustion air so as to ensure complete combustion within the melting zone of the furnace. This enables a substantial reduction in the excess oxygen required in the flue gases from the furnace to maintain an acceptable carbon monoxide level in these flue gases. The burners may also be accurately adjusted during operation of the furnace to maximize the area of the raw batch material covered by the burner flames. The invention permits the economically feasible use of oxygen-enriched combustion air to further boost production. Despite increases in production in the order of 25 percent, the level of pollutant emissions in the flue gases is not increased.

20 Claims, 10 Drawing Figures

3,856,496

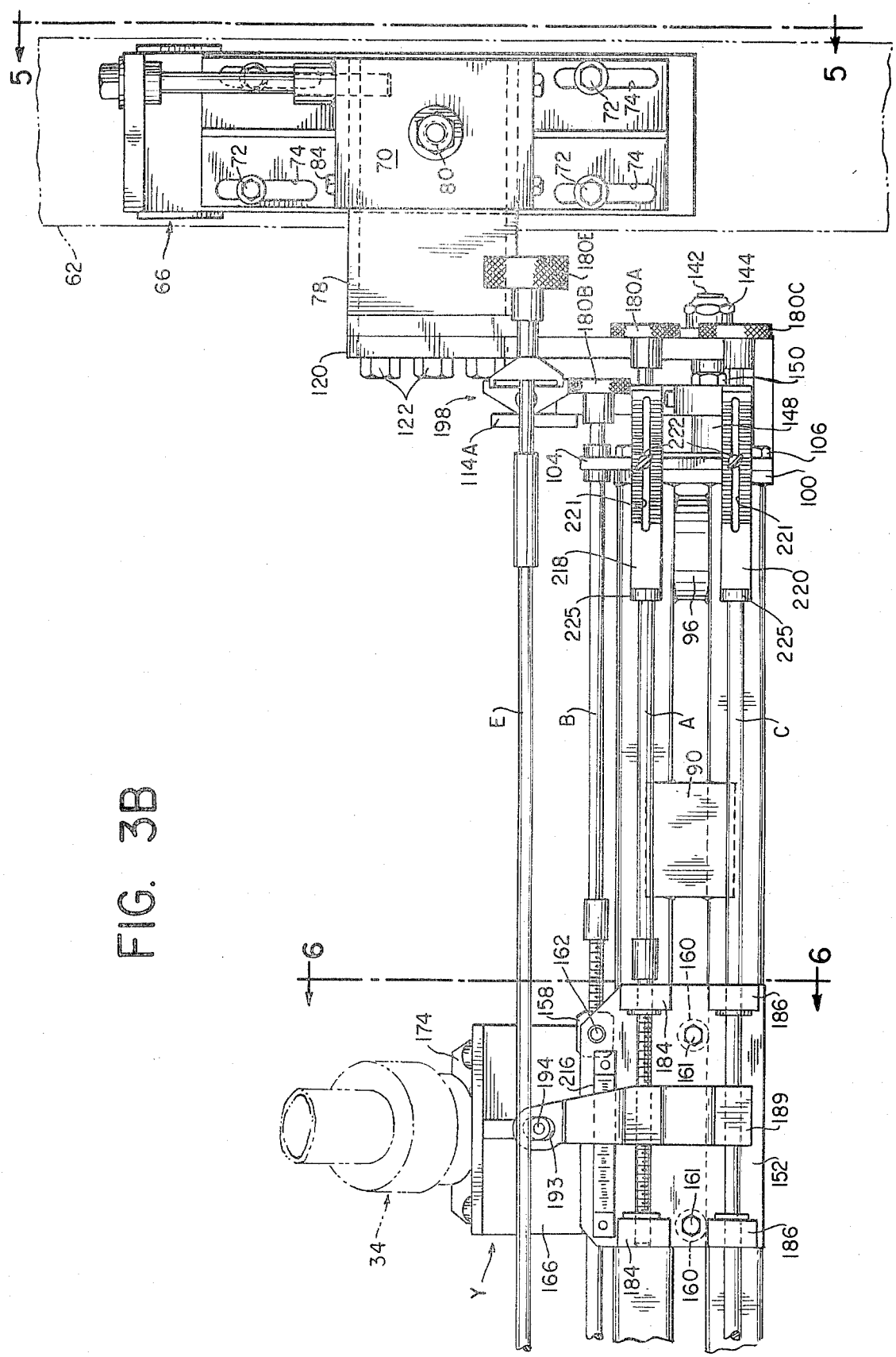

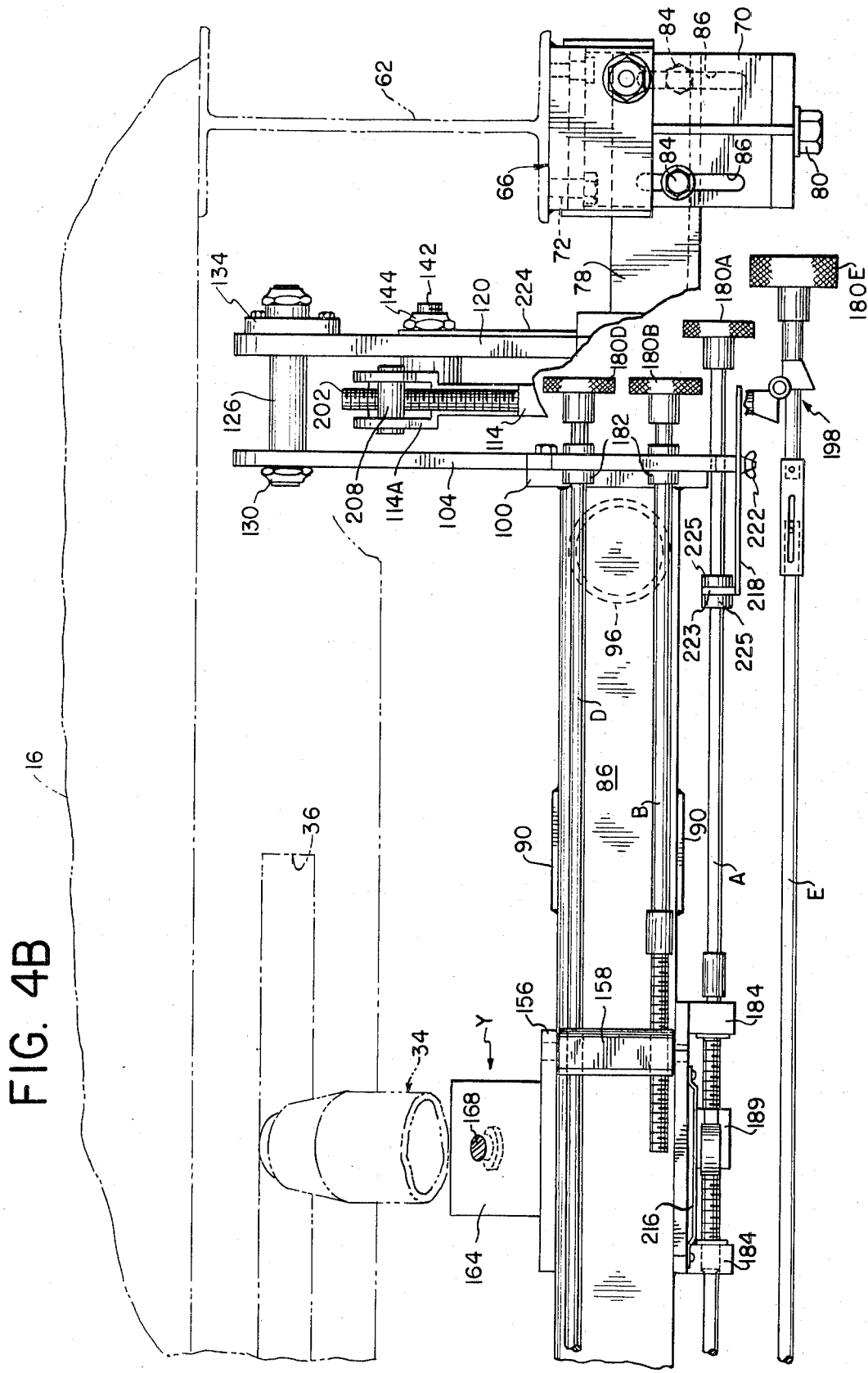

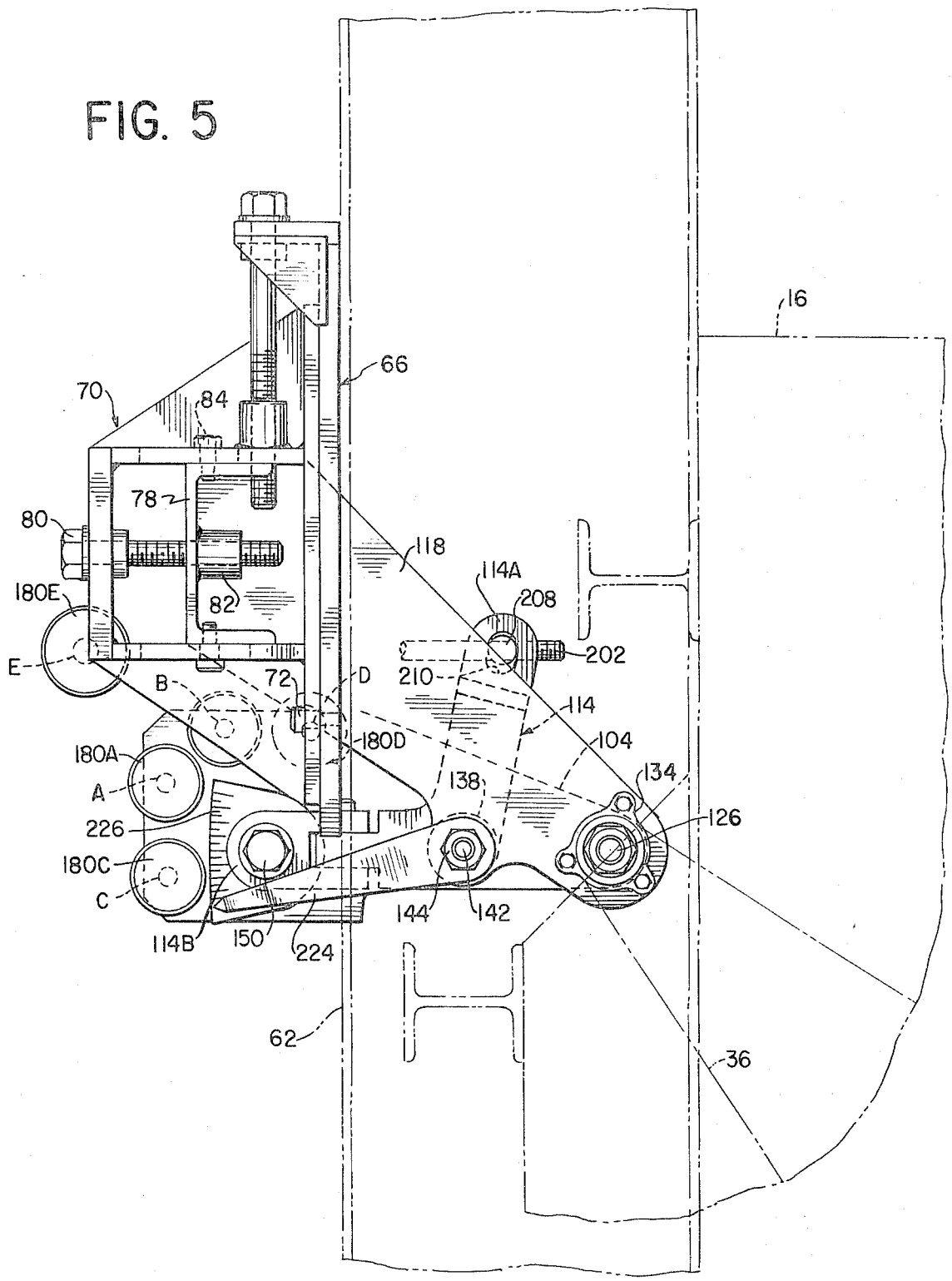

GLASS MELTING FURNACE AND PROCESS

This invention pertains to glass-melting furnaces; more particularly, this invention relates to a method and apparatus for increasing the melting efficiency in a glass furnace so that production rates can be increased without a corresponding increase in the emission of pollutants.

Conventional glass furnaces include a melting zone, into which the raw batch material is charged, separated from a refining zone by a bridge wall. Air fuel burner flames are projected into the melting zone to melt the raw material which then flows through a throat in the bridge wall into the refining zone from which it is discharged. Conventionally, glass melting furnaces burn either natural gas or oil and the present invention may be used with either type of fuel (or other fuels).

In existing glass furnaces, the efficiency of heat transfer (i.e., the amount of glass produced per unit of fuel) is limited by factors such as furnace temperature and oxygen (or air) requirements. If, for example, the temperature of the furnace is too high, the refractory material will dissolve into the glass. This results in inferior glass and, consequently, deterioration of the refractory itself which increases the cost of producing the glass. Also, since it is important that complete combustion of the fuel occur within the melting zone of the furnace (as explained below), standard operating techniques require the use of excess air (i.e., oxygen) to ensure sufficient oxygen within the melting zone to cause complete combustion. As an example, the excess air in the furnace flue may be in the order of 18 percent which corresponds to an excess oxygen level in the order of 3.5 percent. This excess air requirement reduces the efficiency of heat transfer within the melting zone because the excess air must be heated and the energy required for this purpose is not used directly to melt the glass.

The present invention provides an apparatus and process for operating a glass furnace wherein the efficiency of heat transfer from the burning fuel to the melting glass is substantially increased so that for constant production, fuel costs may be materially reduced, or, conversely, for a given amount of fuel, production may be substantially increased. The invention is readily adaptable for use with oxygen-enriched combustion air which provides substantial advantages but which previously has only been of marginal commercial feasibility because of the generation of excessive temperatures in an enriched oxygen atmosphere. The burner adjustment techniques of the invention permit the increased heat from oxygen-enriched systems to be used constructively so as not to cause excessive furnace deterioration or to lower the quality of the finished product.

Known ways to increase the productivity of glass melting furnaces, without reducing the quality of the glass or shortening the life of the furnace, intensify the melting process by oil, gas or electric temperature boosting means. Such means are of marginal practicality because of cost factors and criticality due to the excessive temperatures generated. Moreover, although the creation of higher temperatures will ordinarily result in higher productivity, it has been found that when the productivity of a furnace is increased, it is accompanied by a corresponding increase in pollutant emission. Surprisingly, when production is increased in accordance with this invention, there is no increase in the emission of pollutants.

Briefly, in accordance with the invention, the objects of the invention are accomplished by precisely adjusting the position of the burners to (a) substantially reduce the excess air requirement while maintaining an acceptable carbon monoxide level in the flue gases, and (b) maximize flame coverage of the raw batch material without causing either flame impingement on the furnace walls or excessive seed count in the finished ware.

A preferred embodiment of the invention is shown in the accompanying drawings, in which.

Figure 3A:
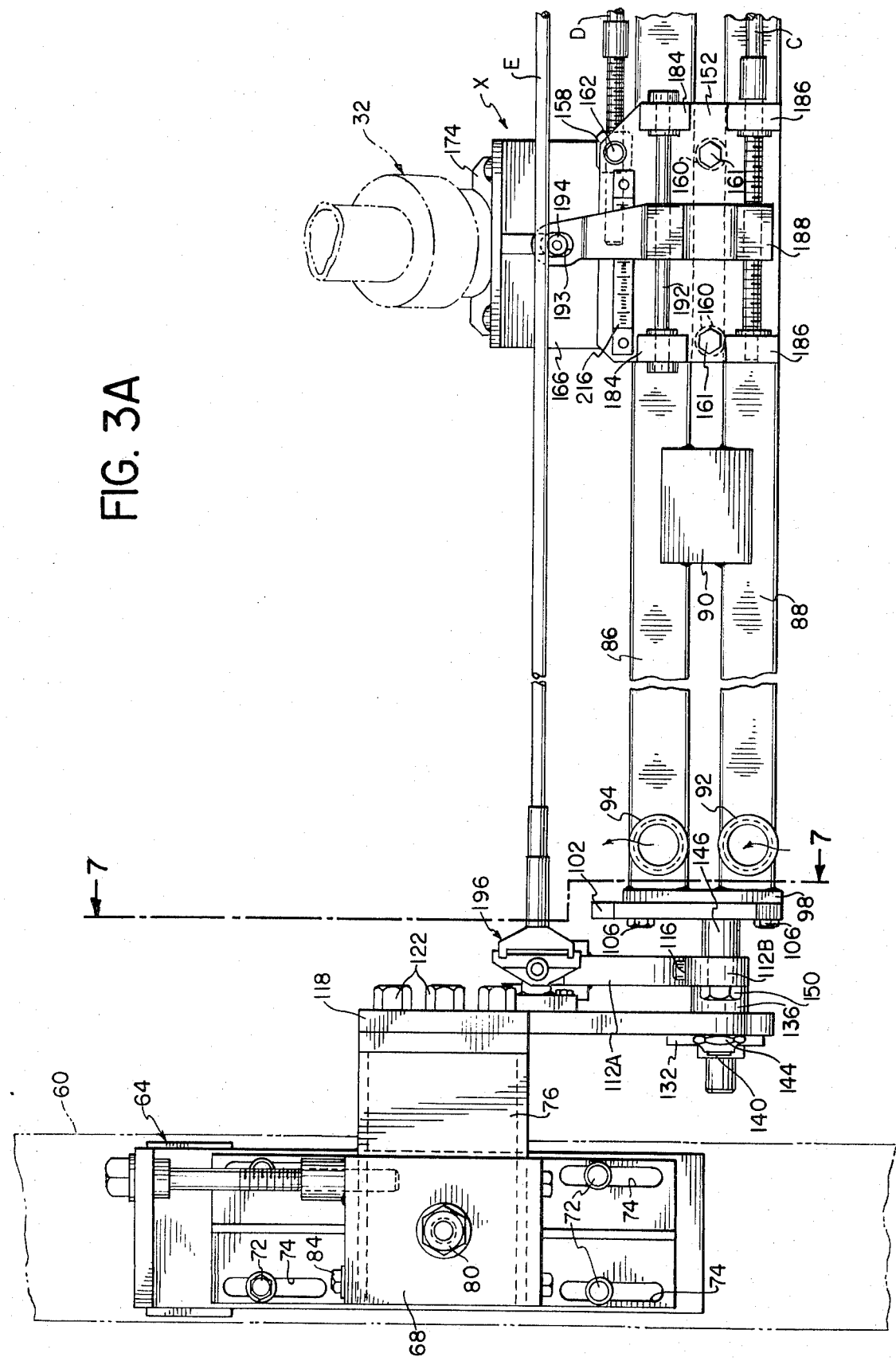
Figure 4A:
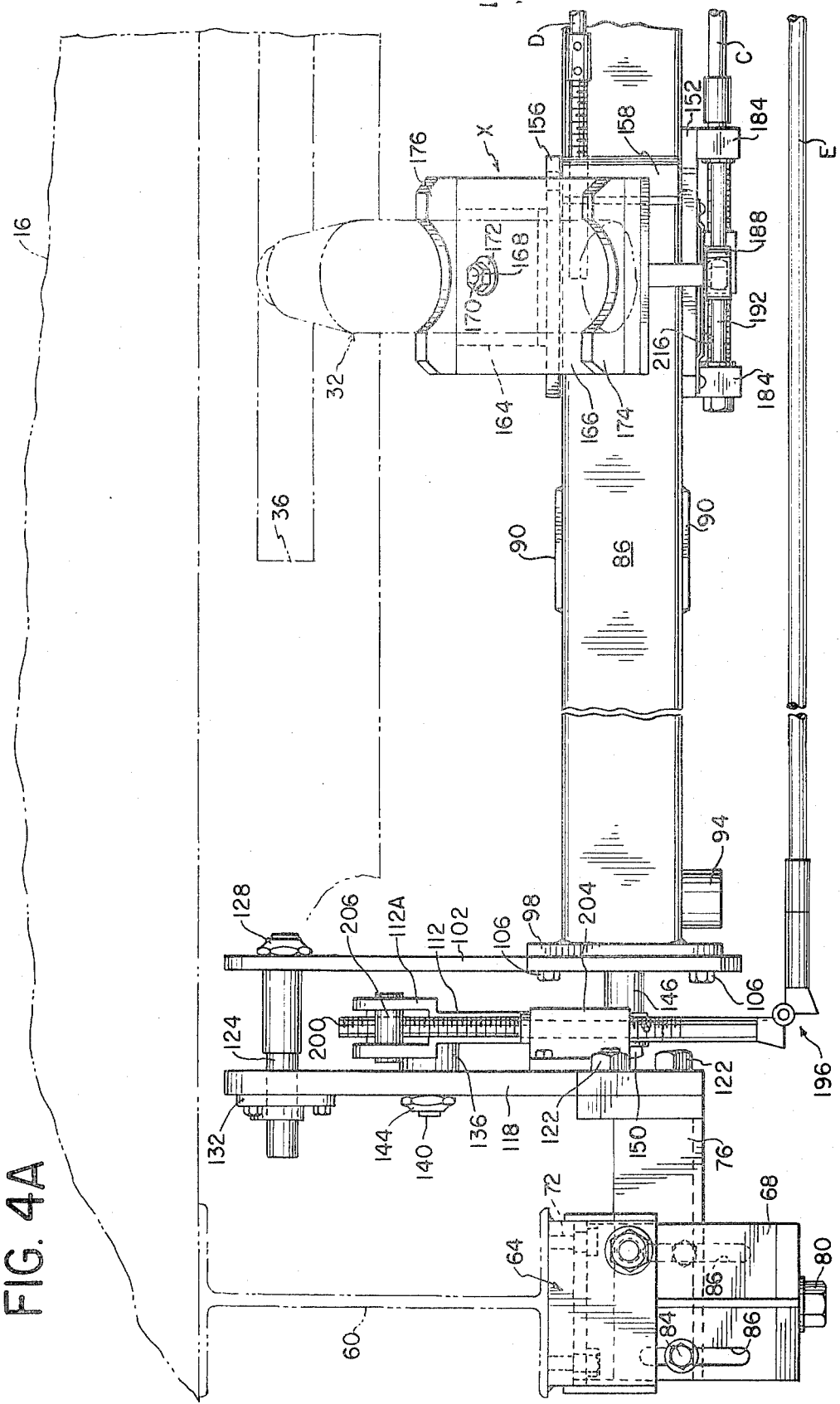
Figure 6:
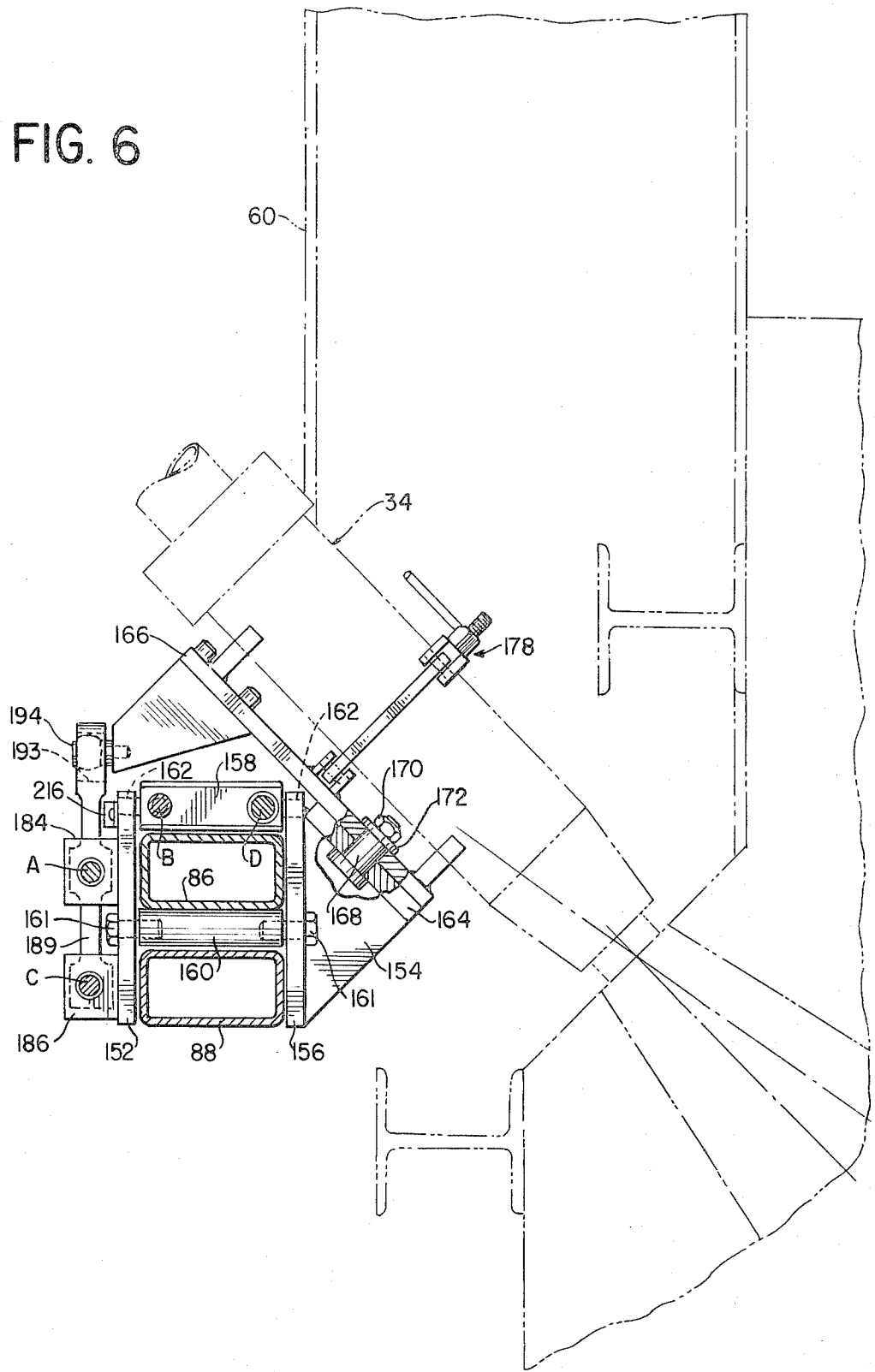
Figure 7:
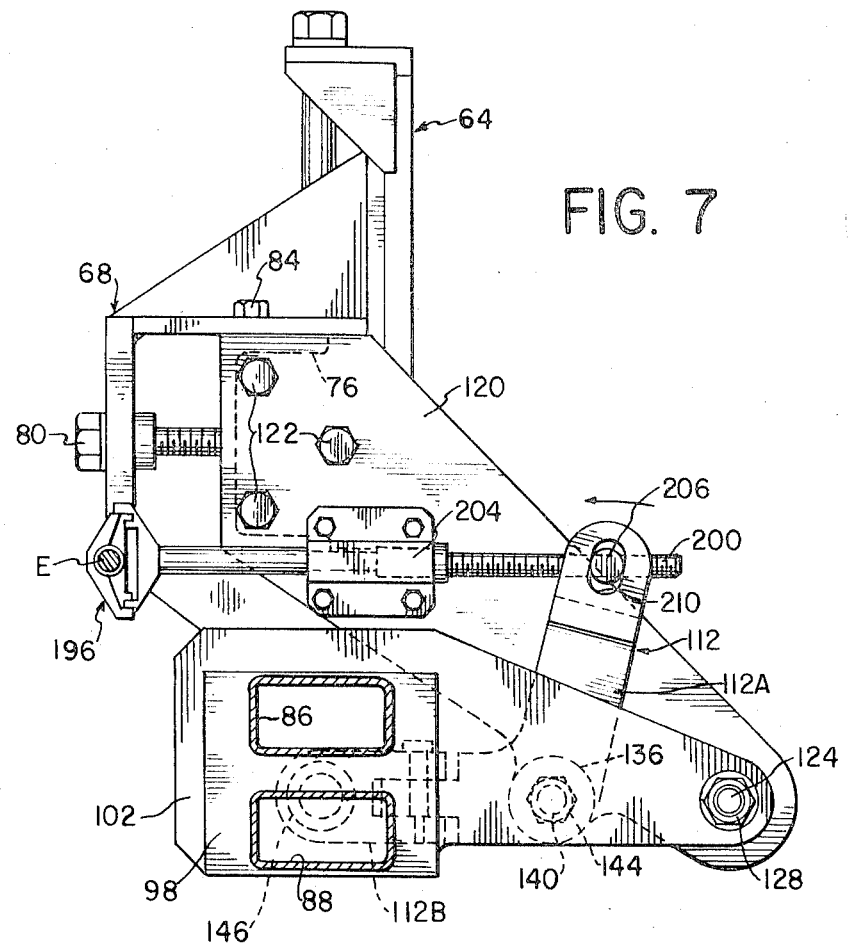

FIGS. 3A and 3B comprise a rear elevational view of a burner positioning device according to a preferred embodiment of the invention;

FIGS. 4A and 4B comprise a plan view of the preferred burner positioning device;

FIG. 5 is a view along the line 5—5 of FIG. 3;

FIG. 6 is a sectional view along the line 6—6 of FIG. 3B;

FIG. 7 is a sectional view along the line 7—7 of FIG. 3A; and

Figure 8:
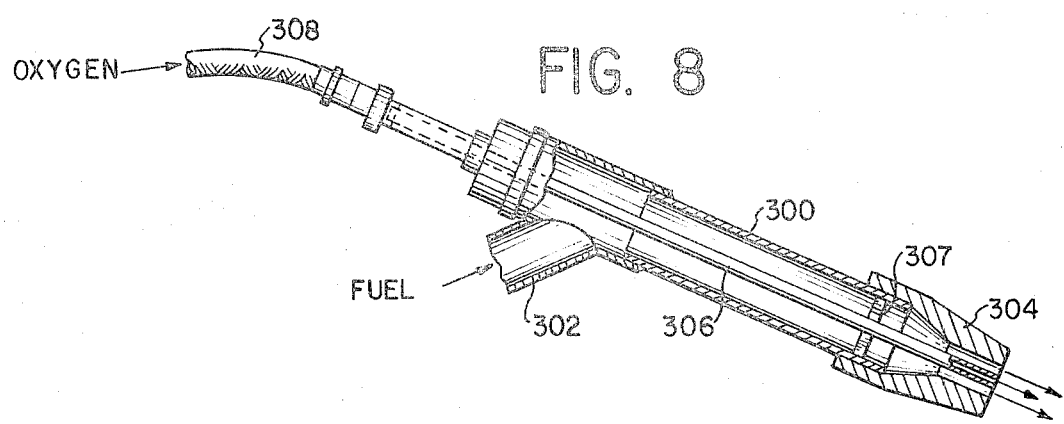

FIG. 8 shows a nozzle construction which feeds oxygen directly into the fuel jets.

Figure 1:
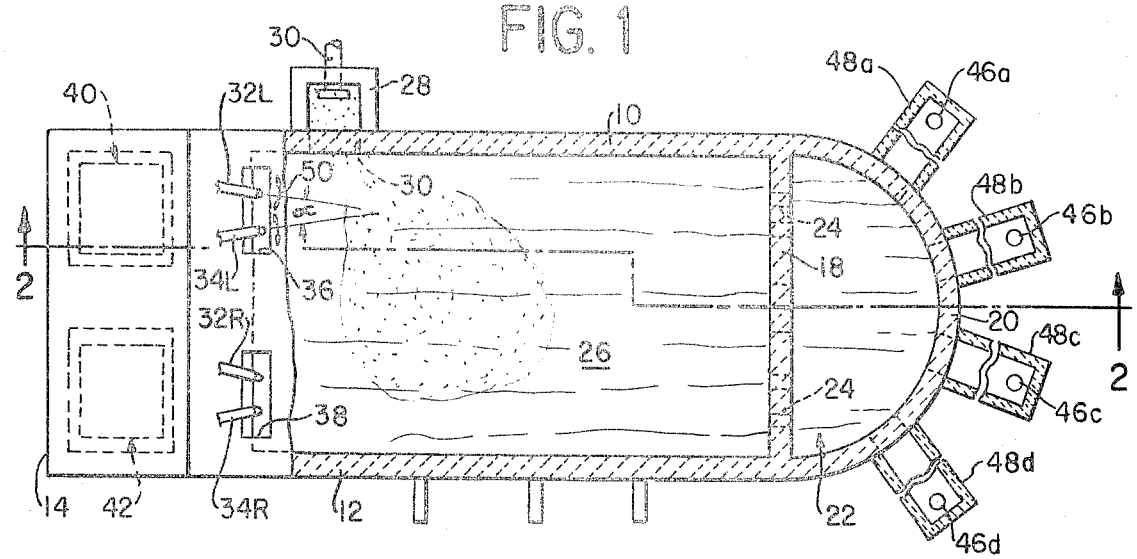
FIG. 1 is a plan view partly in section and partly broken away, of a glass-melting furnace showing the invention diagrammatically.

FIG. 1 illustrates schematically in plan view an elongated regenerative glass tank of conventional construction. The tank is formed in part by sidewalls 10 and 12, end wall 14, back wall 16, a bridge wall 18, curved forward wall 20 and roof and bottom structures 19 and 21, respectively. The bridge wall 18 contains a port or throat 20 located below the surface of the glass which permits the molten glass to enter into the refining end 22. The wall also contains ports 24 above the molten surface to allow hot gases to enter the refining zone. The refining end is located in what is referred to as the nose section of the glass tank. The refining section is defined by the bridge wall 18, the curved wall 20, a roof portion and a bottom portion. The melting zone 26 is defined by sidewalls 10 and 12, back wall 16, bridge wall 18, and roof and bottom structure. In most glass furnaces the roof 19 is arched.

The details of the walls, roof structure, and bottom portion of the furnace are not described in detail since the construction of these known elements forms no part of the present invention. Due to the high temperatures involved in the melting and refining of glass, suitable refractory material must be installed in the interior portions of the walls, roof, and bottom of the furnace.

A structure 28, commonly referred to as a dog house, is mounted on the outside of sidewall 10 near the back wall 16. The term dog house is used to refer to a walled structure through which the raw glass batch materials are introduced into the furnace. The dog house 28 communicates via a port 30 through the side wall 10 with the melting zone 26. Any suitable conveyor means or loading device such as a hopper may be used to deposit the raw batch materials into the dog house 28. The raw materials are dropped on top of the molten bath which is in the bottom portion of the dog house and the raw materials are then pushed into the interior of the glass tank by means of a reciprocating device, such as ram 30. Any other suitable device may be utilized to push the raw materials into the interior of the melting zone 26. The raw materials usually consist of sand, limestone, soda ash, etc. The batch make up depends on the type of glass being made.

The heat necessary for melting the raw materials and for maintaining the molten bath at a desired temperature is provided by two pairs of burners 32L, 34L and 32R, 34R. The burners are designed to burn a suitable liquid fuel such as oil, or a fuel gas such as natural gas. The type of fuel used depends on what is available commercially, the economy of the fuel, and its suitability for glass melting. The burner pairs are positioned in the back wall 16 directly over respective air ports 36 and 38. The ports communicate with conventional regenerators 40 and 42 which are checker brick structures that serve to alternately conserve and capture a portion of the heat energy released in the glass tank and to preheat air before it proceeds to the burners. Burner pairs 32L, 34L and 32R, 34R operate alternately; that is, while one burner is in operation the other burner is in stand-by. For example, if the burners 32R and 34R are in operation they will utilize the air from regenerator 42. The burner usually takes the form of a pipe like structure through which a fuel, such as natural gas, is forced. The air fuel burners 32R, 34R will project a flame jet downwardly into the interior of the glass tank. The hot effluent will flow in a counter clockwise pattern and pass out through port 36 and then through regenerator 40 to heat the same.

After a predetermined period of time (e.g. 15 minutes) or perhaps dependent upon the regenerator temperature, burners 32R, 34R will be shut down and burners 32L, 34L will be fired. The burners 32L, 34L will produce a flame jet and create a circulation in the melting zone which will move in a clockwise pattern, escaping through port 38 and then through regenerator 42 to heat the same.

In this manner the regenerators 40 and 42 are used to preheat the air which is utilized in the air fuel burners. Suitable blowers (not shown) are utilized with the regenerators 40 and 42 to force air through one regenerator to the air fuel burner which is fired and to pull a suction on the other regenerator so that an efficient heat exchange is made.

The glass is removed from the refining zone 22 through orifices 46a–46d in forehearths 48a–48d.

In the operation of a standard glass tank as described there are crude positioning means for the burners which provide some flexibility and increase production by more or less cut-and-try techniques. Excess air (and thus oxygen) is maintained in the flue gases to ensure complete combustion of the fuel within the melting zone 26. Incomplete combustion of the fuel is manifested by excessive carbon monoxide levels in the flue gases, which is undesirable because the carbon monoxide is a pollutant. Equally important, where combustion is incomplete, there is a risk that afterburning of the unburned fuel will occur in the regenerators, which can be very harmful. Also, of course, incomplete combustion wastes fuel and thus decreases furnace efficiency.

To avoid these serious problems, it is a standard practice in the industry to maintain sufficient excess air (i.e., oxygen) in the flue gases to ensure complete combustion of the fuel within the melting zone. For example, it is a common practice to maintain about 18 percent excess air corresponding to about 3.5 percent excess oxygen. However, the energy required to heat this excess air is in effect wasted since such energy is not used productively in melting the glass.

In accordance with the invention, and as explained in detail below with reference to FIGS. 3–7, the individual burners 32L and 34L (32R and 34R) may be adjusted relative to each other to vary the angle between the fuel jets emitted from the burners. This angle is represented diagrammatically in FIG. 1 as the angle $\alpha$ and can be varied by moving the individual burners 32L and 34L in the directions shown by arrows 50. By adjusting this angle, it has been found that it is possible to optimize the mixing of the heated air passing through the air port 36 and the fuel jets from the burners 32L and 34L so that complete combustion of the fuel occurs within the melting zone 26 without the addition of excess air.

Figure 2:
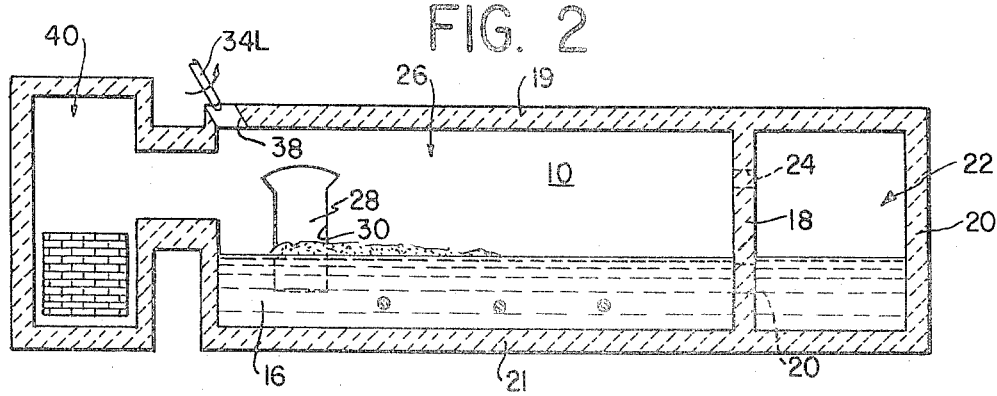
FIG. 2 is a sectional view along the line 2—2 of FIG. 1.

The mixing of air and fuel is also affected, but to a lesser degree, by the vertical angle of the fuel jets. Thus, in FIG. 2 by vertically adjusting the angle of the burners 32 and 34 as diagrammatically represented by the arrow 52 the angle at which the fuel jet intersects the air flowing through the air port 36 can be changed. Hence, by careful adjustment of this parameter also it is possible to further minimize the excess air requirements.

It has been found with respect to all of the adjustments described that small displacements in the order of one degree are critical. In accordance with the procedures of the invention, it is necessary that the burners be moved in small increments (one degree in the preferred embodiment) and the results analyzed as described below before further adjustment occurs. When these procedures are followed, substantial increases in efficiency are provided.

In the preferred embodiment, and as described below with respect to FIGS. 3–7, the individual burners 32 and 34 may be pivoted as indicated by the arrows 50. Although the burners emit two fuel jets, essentially, the fuel jets from the two burners together may be considered to form a single flame the axis of which bisects the angle $\alpha$. By pivoting both of the burners together, it is possible to adjust the flame axis toward or away from the walls 10 and 12 while maintaining $\alpha$ substantially constant. In describing the process below, the horizontal adjustment of the burner angle refers to the adjustment of this flame axis and, thus, the entire flame from the combined burners.

There are many ways of determining whether the furnace is producing the desired quality glass. The seed count or number of small gas bubbles per ounce of glass is a convenient measure and was used as a measure of quality in the experimental work performed with the invention.

After the burners have been positioned within the air ports 36 and 38, the first step in the adjustment procedure is to determine the vertical angle of the burners. It is desired to get the flame as close as possible to the burners so that unmelted glass will not appear at wall 18. However, if the angle of attack is too steep, the quality of the glass will deteriorate. Therefore, in accordance with the invention the vertical position of the burners is first adjusted by bringing the flame back in 1° increments until there is a sharp rise in seed count. This measurement of course will take a substantial period of time since the effects of the burner adjustment are not instantaneous. When the seed count jumps, the burners are then moved forward 1°.

The horizontal position of the burners is adjusted next. The burners are started from a center position (approximately as shown in FIG. 1) and then brought in 1° increments toward the side walls 10 or 12 as the case may be. The temperature of the interior wall of the furnace is measured (for example) by means of an optical pyrometer through suitable ports in the opposite sidewall. When the temperature of the interior wall of the furnace jumps suddenly (by about 60° to 100°) the flame is impinging upon the wall and serious damage to the refractory could result. The burner position is then returned 1°.

After the burners on the right have been adjusted, the burners on the left are similarly adjusted. Because of doghouse 28, the adjustment of the two pairs of burners will be slightly different.

As mentioned above, the key parameter in minimizing excess air in the flue is the angle between the burners shown as $\alpha$ in FIG. 1. To adjust the angle, the individual burners of a burner pair are adjusted until the fuel jets intersect at the surface of the glass within the melting zone 26. This is to maximize heat transfer between the fuel and the raw batch material. In this position, the gases in the flue are examined to determine the oxygen level and the carbon monoxide level in the flue gases. The angle $\alpha$ is then changed in 1° increments (+ or −) to minimize the amount of excess oxygen in the flue gases while maintaining acceptable carbon monoxide levels.

Experimental work with the invention was performed on a 384 sq. ft. end-port furnace producing flint container glass and having the following characteristics:

| | |
|---|---|
| Maximum Production Rate | 94 tons/day |
| Furnace Efficiency | 7.6 × 10⁶ Btu/ton |
| Minimum Excess Air Required | 15% |
| Average Bridgewall Temperature | 2780°F |
| Seed Count | 100–150 seeds/ounce |
| Regenerator Temperature (Maximum Refractory Temperature Before Reversal) | 2325°F |

The test furnace used over-port-firing with the burners angled down toward the glass surface. The burner blocks were specially built to permit large burners position changes. The maximum angle through which test burners could be adjusted was 30°.

The burners were a conventional type consisting of two inch diameter pipes with removable tips to allow changes in the burner diameter. Burners with a 1⅛ inch tip diameter were used throughout the experiments.

In actual tests, excess air requirements in the production test furnace were reduced from about 18 percent to 8 percent. This reduces the oxygen in the flue gases from about 3.5 percent to 1.5 percent. This reduction was made possible by only a very small burner angle change, about 2° or 3°. For the production testfurnace, reducing the needed excess air from 15 percent to 8 percent allowed a reduction of gas input to the furnace by 1,500 CF/hr. while maintaining a constant furnace temperature and production rate. Heretofore, this gas was needed to heat the extra air up to flue gas temperature. When the test furnace excess air was reduced from 15 percent to 8 percent and the gas input held constant, the melting capacity increased from 94 tons per day to about 100 tons per day, an increase of about 6.5 percent in the production rate.

If increased production is more desirable than reducing gas consumption, the increase in melting efficiency can provide the added production. When the fuel required per ton of glass melted was decreased from 6.7 million to 6.1 million Btu in the production test furnace, and the gas input held constant, the melting capacity increased from 100 to 106 tons per day.

The critical burner position which ultimately determines the melting efficiency is the angle of attack with the glass surface (vertical angle). Generally, if production rates are to be increased, the burners must be angled more downwardly toward the glass. The optimum burner position will be different for each furnace and set of operating conditions. However, the proper burner position can usually be determined in one day with a precise burner positioning device.

Direct flame impingement on the refractories creates a serious localized overheating problem. Flame impingement occurs when as yet unmixed, unburned gas and air reach a refractory surface. When they strike the wall, mixing is completed, combustion occurs, and the refractory is subjected directly to flame temperatures.

Gas temperatures as high as 2,980° F could be created adjacent to the sidewalls by improperly directing the flame toward a sidewall to create impingement. Temperature profiles were measured in the furnace where the flame had been intentionally shifted through (improper) burner position toward the furnace sidewall until impingement occurred. When impingement occurred, the gas temperatures at the wall were near to or higher than the gas temperatures across the width of the furnace. The measured temperature of the refractories was 2,925° F, only 50° F below the peak gas temperature. During these tests, visible slagging or melting was observed within a few hours of the start of impingement.

The controlling factor in sidewall localized overheating is solely impingement. Once the flame is moved far enough from the wall to eliminate impingement, further movement away from the wall had little effect on reducing temperature. In one experiment, three inward burner adjustments were made, each being 1°. Prior to making these moves, there was visible flame impingement on the wall and a wall temperature of almost 2,900° F. After the first 1° move, there was still visible flame impingement and the data supported that condition. The wall temperature had only dropped about 5° F to 2,890° F. After the second 1° inward burner adjustment, the flame separated from the wall and a major reduction in temperature was measured. The final wall temperature was 2,820° F, a decrease of 70° F with only a 1° burner movement. Glass quality remained good and the pattern or position of the batch piles was not observed to change. A third and final 1° inward adjustment produced only a 5° F reduction in wall temperature.

Glass Quality

Throughout all of the changes made on the furnace to either reduce gas consumption or increase production, acceptable glass quality was maintained over the range of variables we investigated. Glass quality was determined with the standard methods of the glass industry; i.e., seed count, pressure breakage, impact strength, etc.

Emission of Air Pollutants

Air pollution sampling measurements were made before and after changes in the furnace operating conditions to increase production. No significant changes occurred in the emissions of either the oxides of nitrogen (average concentration 344 ppm after stack dilution), or the particulate matter (average concentration 0.0253 grains per standard cubic foot of sample gas as determined by the New Jersey State Department of Environmental Protection in a 1970 survey).

Oxygen Enriched Combustion Air

The use of combustion air having more than 21% oxygen (oxygen-enriched air) increases the maximum production of a glass melter by: (1) increasing the available heat input to the furnace, (2) increasing the normal maximum amount of fuel that can be burned in the furnace by decreasing the total volume of combustion products that must be handled by the flue system, and (3) increasing heat transfer rate at the cold batch end of the furnace.

With ambient air, the theoretical flame temperature is approximately 3,575° F, but at a 23 percent oxygen-enriched air level, the flame temperature approaches 3,900° F. Actual flame temperature is considerably lower for both cases because of heat transfer from the flame during combustion.

It is the higher temperature of the flame and increased concentration of constituents of the flame that are primarily responsible for gas radiation which increases the heat transferred to the glass per unit of time. The primary mode of heat transfer in a glass melter is radiation, and the rate at which heat is transferred by radiation is proportional to the fourth power of the temperature of the radiating material. Therefore, small increases in flame temperature increase the rate of heat transfer, the rate of melting increases, and higher production rates can be maintained.

In addition to increasing the rate of heat transfer, oxygen enrichment, by virtue of a substantial reduction in the amount of nitrogen in the combustion air, significantly reduces the total volume of combustion products.

It was calculated that increasing the oxygen content of the combustion air to 23 percent would increase the radiant heat transfer by a factor of about 1.25. This would indicate that about a 25 percent increase in production could be possible. Experimental trial runs achieved production increases as high as 12 percent. Several short-term tests indicated that production increases up to 18 percent may be possible.

Increasing porduction is the prime objective of using oxygen enriched combustion air. With the proper combustion conditions, the production test furnace output increased from 106 tons per day to 119 tons per day using combustion air enriched to 23 percent. The glass melting efficiency at this production level was 6.4 million Btu per ton of glass. A production rate of 124 tons per day was later reached on a short-term basis. All of the available information indicates that this produciton could have been sustained. The fuel utilization was 6.1 million Btu per ton. Oxygen consumption at the 119 tons/day production rate was 0.5 tons/ton of increased glass production.

A final sustained production rate of 119 tons per day was achieved by combining enriched air with proper burner position to correct for the new heat release and transfer conditions. When the oxygen concentration in the air was increased, the heat release from the flame increased nearer the burner and the flame shortened. This condition promoted faster melting but tended to let unmelted batch move out beyond the "hot spot" zone and travel down to the furnace throat. However, the changing character of an oxygen enriched combustion air flame can be corrected to "corral" the batch piles behind the "hot spot." Elevating the burners about 2° to 4° allowed the now shorter flame to penetrate further out into the furnace. Experimental work showed that different amounts of elevation were required for different enrichment percentages as shown below.

| Enrichment,% | Increase in Burner Elevation, degrees |
|---|---|
| (Normal Air, 21) | — |
| 22 | 1–2 |
| 23 | 2–4 |
| 24 | 5–7 |

The burner angle changes were very small and need to be known within ± 1°. Therefore, to make the necessary burner adjustments when using oxygen enriched air, a precision burner position is required.

Proper burner position is more critical to good refractory life when using oxygen-enriched combustion air than with normal air. The oxygen-enriched air flame itself is hotter than the normal air flame. Therefore, if the flame impinges directly on a wall, the damage due to overheating will occur more rapidly. This effect was seen in several tests where the flame was intentionally directed toward the furnace sidewall to create impingement. The burner adjustment consisted of maintaining the same angle between the two burners but moving the axis of the resultant flame toward the wall. As expected, the wall temperature increased. The rise in temperature was small because the burner was moved only 2° to minimize the danger of severe over-heating from full impingement. When the burner was returned to its original position, the wall temperature decreased to its original level.

The quality of the finished product can be significantly influenced by changes in production rate and furnace temperature accompanying changes in combustion conditions. In general:

A. While seed count, as one measure of glass quality, varies with changes in bridgewall temperature caused by changes in gas input, changes in bridgewall temperature caused by burner position movements do not affect seed count.

B. Seed count varies linearly with production rate for a furnace using either conventional combustion air or oxygen-enriched air.

C. Large single production increases are conducive to forming "stones" in the glass for 12 to 24 hour periods following the change. This problem can be avoided by making the production increase in several smaller increases of less than 5 tons/day each separated by 24 hours of operating time.

Tests showed that for a constant production rate, decreasing bridgewall temperature 25° F by reducing the gas input increased the seed count. However, when the bridgewall temperature was decreased the same 25° F from 2,775° to 2,750° F using burner positioning, the seed count did not increase. Burner positioning proved to be a better way to control bridgewall temperature than fuel control while maintaining constant glass quality.

Air Pollution Emissions

The major air pollution emissions from a gas-fired glass melter are nitrogen oxides ($NO_x$), sulfur oxides ($SO_x$), carbon monoxide (CO), and particulates. In addition, traces of halides have also been found. During the course of this program, air pollution measurements were made on the experimental facility under a variety of furnace conditions to determine the effects of furnace variables on emissions. In general, no direct correlation between emissions and production rate, fuel input, furnace temperatures, or the use of oxygen-enrichment were found. The air pollution emissions do not increase when the furnace is fired using oxygen-enriched combustion air.

Carbon monoxide is formed in the combustion process primarily by poor mixing of gas and air causing slightly incomplete combustion. The long, luminous flame typical of a glass melting furnace is conducive to carbon monoxide formation unless large amounts of excess air are used. When using 18 percent excess air, the CO concentration at the stack inlet was 40 ppm. When excess air was reduced to approximately 8 percent without any other changes in furnace operation, the CO concentration increased to between 200 and 400 ppm. Reducing the amount of excess air from 18 percent to 8 percent on the test furnace resulted in the reduction of natural gas input by 1,500 CF/hr.

According to the invention, CO concentration can be held essentially constant (35–50 ppm) while reducing excess air by precise burner adjustment. Generally, increasing the angle of convergency of the gas jets improves mixing, which allows satisfactory CO emissions at lower amounts of excess air.

It was also found that correct burner adjustment can maintain the CO concentration between 35 and 50 ppm as production is increased using oxygen-enriched combustion air while holding excess air at 8 percent. Table I shows measured CO concentrations in the stack gases as a function of production increases while using oxygen-enriched combustion air. In each case, the burners were set at the same angle of convergency. This indicates that once the proper burner position is determined for minimizing excess air, the position is appropriate to a wide range of operating conditions.

TABLE I (CO Levels for 23% Oxygen Enrichment)

| Production Rate | CO Level (PPM) |
|---|---|
| 95 | 45 |
| 100 | 40 |
| 106 | 45 |
| 107 | 50 |
| 108 | 40 |
| 109 | 45 |
| 110 | 50 |
| 114 | 45 |
| 115 | 40 |
| 119 | 35 |

Carbon monoxide measurements were made at the stack inlet before addition of dilution air using a non-dispersive infrared analyzer (Mine Safety Applicance Lira 200).

Excess air was monitored by means of a hydrocarbon and oxygen analyzer.

There are many possible ways of providing precise control of the burner position according to the invention. For example, Dunlap U.S. Pat. No. 2,931,428 shows a tank burner adjustment device which, with appropriate modification, could be used to provide the precise burner adjustment required to practice the invention. FIGS. 3–7 illustrate a preferred embodiment of a precise burner positioning apparatus which has been used on an experimental basis to achieve the results described above. The apparatus of FIGS. 3–7 may be used for both pairs of burners.

In FIGS. 3A and 3B, two buckstays of a standard glass-melting furnace are shown in phantom lines at 60 and 62. A pair of mounting brackets 64 and 66 are permanently fixed to the buckstays 60 and 62 by suitable means (not shown for purposes of clarity). Additional mounting or channel brackets 68 and 70 are adjustably positioned on mounting brackets 64 and 66, respectively, by means of bolts 72 passing through slots 74 wihtin the channel brackets. This arrangement permits vertical adjustment of the entire burner positioning apparatus so that the burners may be properly located with respect to the air ports 36, 38 in the furnace.

Channel bracket extensions 76 and 78 extend toward each other from the respective channel brackets 68 and 70. Each of these extensions 76 and 78 are adjustably mounted to the brackets 68 and 70 by means of a threaded bolt 80 and nut 82 (FIG. 5) to enable the burner adjustment apparatus to be moved toward or away from the furnace opening. Bolts 84 pass through elongated slots 86 within channel brackets 68, 70 and into threaded engagement with the sides of the channel bracket extensions 76, 78 to secure the channel bracket extension in the desired location relative to the furnace.

The left and right burners 36 and 34, respectively, are shown in phantom in FIGS. 3, 4 and 6. Each burner is mounted on a carriage described in further detail below with reference to FIG. 6. These carriages are indicated generally at X and Y in FIGS. 3 and 4 and are movable with respect to two parallel, rectangular channel members 86 and 88 which are separated by spacer blocks 90. The lower channel member 88 includes a coolant inlet 92 and the upper channel member 86 includes an outlet 94, with a fluid connecting piece 96 located at the other end so that a coolant (e.g., water) may be circulated through channel members 86 and 88.

Channel members 86 and 88 terminate in vertical plates 98 and 100 to which they are welded or otherwise secured. Plates 98 and 100 are attached to pivotable arms 102 and 104 (see FIGS. 5 and 7) by bolts 106 (FIG. 3A).

The assembly includes two bell cranks 112 and 114 which are two-part constructions including respective L-shaped main parts 112A and 114A (FIG. 7) cooperating with movable extensions 112B and 114B. A pin 116 slides within a slot (not numbered) in the portion of the bell crank portion 112A (114A) extending into a slot within the extension portion 112B (114B).

The assembly as so far described is supported on a pair of fixed support arms 118 and 120 which are secured to respective channel bracket extensions 76 and 78 by bolts 122. Axles 124 and 126 extend outwardly from the pivotable arms 102 and 104 (see FIGS. 4A and 4B) and are secured by nuts 128 and 130. These axles are received for rotation within suitable bearing blocks 132 and 134 mounted to the fixed supporting blocks 118 and 120. The bell crank sections 112A and 114A include outwardly extending collars 136 and 138 which are pivotally mounted on axles 140 and 142 secured to the main support arms 118 and 120 by nuts 144. The bell crank extensions 112B and 114B are fixed by bolts 150 to threaded protrusions 146 and 148 extending outwardly from pivotable arms 102 and 104, respectively. This construction, as described in further detail below, enables vertical positioning of the burners by pivoting the entire assembly about axles 124 and 126.

The details of the carriages which carry the burners are shown in FIGS. 3, 4 and 6. Since the actual construction of the burner nozzles and the means by which the fuel is fed to these nozzles may be standard, these details have been omitted from the drawings. The carriage constructions are identical and only one is described below.

Each carriage includes a side plate 152 and a triangular bracket 154 having a face plate 156. The side plates 152 and face plates 156 are arranged on opposite sides of the channel members 86 and 88 and secured to upper blocks 158. Respective rollers 160 are rotatably supported on bolts 161 extending through plates 152 and 156 between the channel members 86 and 88. The upper block 158 may include oppositely extending pins 162 which are received in corresponding apertures (not numbered) of the plates 152 and 156.

The triangular bracket 154 includes a slanted upper face 164 on which a pivot plate 166 is mounted. A short axle 168 extends upwardly through the bracket face 164 and through a corresponding opening in pivot plate 166 where it is retained by a nut 170 and washer 172 so that pivot plate 166 can pivot about axle 168.

The burner nozzle rests on contoured upstanding walls 174 and 176 extending from the upper surface of pivot plate 166. The burner may be clamped onto the walls 174 and 176 by a suitable clamping mechanism 178 which may be conventional.

The means for moving the burners comprise five elongated threaded drive rods labeled A, B, C, D and E as shown in FIGS. 3, 4 and 5. Each of these drive screws terminates at its right-hand end in a manually operable knob 180A, B, C, D and E, respectively, which can be turned to provide the required movement. The rods A, B, C and D are journaled within suitable apertures (not numbered) within the right-hand pivotable arm 104. Suitable bearing means such as bushings 182 (FIG. 4B) may be provided for the individual drive rods, if desired.

Horizontal Angular Adjustment

Each of the carriage side plates 152 includes rearwardly extending upper blocks 184 and lower blocks 186 (FIGS. 3 and 6). Rod A is journaled in the upper blocks 184 of the right-hand carriage Y with the threaded portion of rod A positioned between these two blocks. Rod C extends through the lower blocks 186 of the right-hand carriage Y and also through the lower blocks 186 of the left-hand carriage X, with the threaded portion of rod C positioned between the lower blocks 186 of the left-hand carriage. Suitable bearing means (not numbered) within the blocks 184 and 186 receive the rods A and C.

The carriages X and Y include vertical connecting arms 188 and 190, respectively, which include threaded apertures meshing with the threaded portions of rods C and A, respectively. The unthreaded portion of rod C passes through a hole within the lower portion of the connecting arm 190 to serve as a guide rod for arm 190. A rod 192 extending between the upper blocks 184 of the left-hand carriage X passes through a hole within the left-hand arm 188 to serve a similar guide function.

The connecting arms 188 and 190 include slots 193 in their upper ends which engage cam followers 194 extending outwardly from the pivot plates 166. Hence, movement of arms 188 or 190 in either direction exerts a force against the corresponding cam follower 194 to cause the associated pivot plate 166 (and thus its burner) to pivot about the corresponding axle 168. In this way, the drive screws A and C permit precise adjustment of the angular position of each burner of a pair of burners so as to vary the angle $\alpha$ described above in connection with FIGS. 1 and 2.

Horizontal Linear Adjustment

The left-right or horizontal positioning of the burners is provided by the drive rods B and D. Rod B terminates in a threaded portion which engages the threads of a bore within block 158 of the right-hand carriage Y. The rod D includes an elongated unthreaded portion which passes through suitable bearing means in the right-hand block 158 and terminates in a threaded portion which is in engagement with a threaded bore within the block 158 of left-hand carriage X. Thus, rotation of rods B and D will cause left-right or horizontal movement of the right-hand carriage Y and left-hand carriage X, respectively.

Vertical Angular Adjustment

The drive rod E controls the vertical angle at which the flame strikes the molten bath. For purposes of clarity, the means which support rod E for rotation are not shown in the drawings.

The drive rod E includes standard universal joints 196 and 198 (FIGS. 3 and 4) positioned at its left and right extremities. Threaded terminations 200 and 202 extend from the output side of the universal joints 196 and 198, respectively, and rotate with rod E as knob 180E is turned. The threaded extensions 200 and 202 are journaled in blocks 204 (FIGS. 4 and 7) which are bolted to the fixed support arms 118 and 120. The threaded portions of extensions 200 and 202 engage threaded cams 206 and 208, respectively, which slide in elongated apertures 210 within the bifurcated free ends of the bell crank portions 112A and 114A. Thus, as knob 180E is rotated, the rotation of extensions 200 and 202 through universal joints 196 and 198 causes the bell cranks 112 and 114 to rotate with respect to the fixed arms 118 and 120 about the axles 140, 142. This, in turn, causes the pivotable arms 102 and 104 to rotate with respect to the support arms 118 and 120 about the axles 124 and 126. The movable connection between the bell crank portions 112A and 112B (114A and 114B) is required because the distance between the axles 124 and 140 (126 and 142) changes as the pivotal arm 102 (104) rotates with respect to the fixed support arm 118 (120).

The invention requires precise and reproducible positioning of the burners to achieve the improved efficiency described above. Therefore, in accordance with a further feature of the preferred embodiment illustrated in FIGS. 3–7, a number of scales are positioned on the apparatus so that the angular or linear displacement of the burners can be measured. Each of the carriage side plates 152 includes a scale 216 (FIGS. 3, 4, 6) secured, for example, to the plate by screws. The linear displacement of the connecting arms 188 and 190 is indicated by the positions of these members relative to the scales 216 which can be calibrated in degrees to indicate the angular position of the separate burners.

Similar scales 218 and 220 may be mounted on the rods A and C, respectively, to indicate the linear displacement of the carriages Y and X, respectively. The scales 218 and 220 may include elongated slots 221 (FIG. 3B) through which thumbscrews 222 extend into engagement with the end of the pivotable arm 104. The scales are supported on annular disc 223 which are rotatably mounted on their associated rods A and C between circular plates 225 which are fixed to the rods. Tightening of the thumbscrews 222 will prevent linear movement of the drive rods A and C as the carriages Y and X are moved by rotation of rods B and D. When the thumbscrews are loosened, the position of each thumbscrew relative to its associated scale provides an indication of the displacement of the respective carriages by rotation of the knobs 180B and 180D.

The change in the vertical angle is indicated by the cooperation of a pointer 224 and scale 226 (FIG. 5). The scale 226 is secured to the pivotable arm 104 and thus moves with respect to the pointer 224 which is secured to the fixed support arm 120.

Oxygen-enriched combustion air is produced by mixing normal air (which contains 21% oxygen) with pure oxygen. Of the several possible methods of mixing air and oxygen, the simplest is to inject pure oxygen directly into the combustion fan inlet duct which blows the air in the regenerators through the air ports. Pure oxygen is best stored as a liquid and converted to its gaseous form prior to its use. Conventional metering equipment (e.g. orifice meter, control valves, etc.) may be used to properly proportion the air and oxygen to obtain the desired percentage of oxygen in the final enriched mixture. The means for storing, metering and vaporizing the oxygen are not themselves features of this invention, and, therefore, are not described herein.

A more sophisticated burner construction wherein the oxygen is injected directly into the fuel at the nozzle is shown in FIG. 8. The burner includes a cylindrical pipe 300 having a fuel inlet 302 which feeds the fuel (gas or oil) to the burner. Pipe 300 terminates in a nozzle tip 304 from which the fuel jets are emitted.

A tube 306 is coaxially positioned within pipe 300 by means of three fins 307 which permit the gas or oil to flow through pipe 300. Oxygen is fed to tube 306 by means of a hose 308 connected thereto in a fluid type relation so that the oxygen and fuel are emitted together from the nozzle tip 304. Coaxial injection of the oxygen into the fuel provides improved mixing and, thus, still more complete combustion of the fuel.

The size of the coaxial nozzles should be in a relation such that the fuel and oxygen momentums are equal to each other. Since the mass of a gas is equal to density times velocity, the momentum of a gas is the product of density and velocity squared. Equalizing momentums reduces the mixing of fuel and oxygen near the burner port so that most of the mixing, and thus maximum heat release, occurs on the surface of the melting glass batch where desired. This effect is due to the fact that the mixing is determined by the shear forces which exist between the respective fuel and oxygen streams and the shear forces are minimized when the momentums are equal.

It has also been discovered that if the oxygen and fuel are introduced into the furnace together, backfiring may occur. Therefore, the metering equipment which feeds the oxygen to the furnace should delay the oxygen feed until the fuel flow has been fully established. Similarly, during reversal it is important that the oxygen flow be interrupted before the fuel flow is cut off. By way of example, there may be at least a 5-second interval between oxygen and fuel cutoff. The specific timing circuits required to achieve this result will be obvious to those of ordinary skill in the art.

Although the invention has been described with reference to a particular type of glass melter, the principles are equally applicable to other types of furnaces such as side-port tanks and the like.

What is claimed is:

1. The method of preparing and operating a glass melting furnace, said furnace including burners for admitting at least one pair of fuel jets into a melting zone of the furnace for mixture with air which is fed into the melting zone through air ports, comprising incrementally adjusting the directions in which said fuel jets are emitted with respect to the air flowing through said ports, measuring the amounts of excess air and carbon monoxide in the flue gases from the furnace after each incremental adjustment of said fuel jets, monitoring the quality of the glass pulled from the furnace, and continuing to adjust incrementally the directions of said fuel jets until said excess air has been minimized with the level of carbon monoxide being maintained below a preselected level while maintaining acceptable glass quality to thereby increase the mixing of fuel from the burners with air flowing through said air ports.

2. The method of preparing and operating a glass furnace according to claim 1, wherein said adjusting step comprises adjusting the angle between said two fuel jets.

3. The method of operating a glass furnace according to claim 1, wherein said adjusting step comprises adjusting the angle between said two fuel jets.

4. The method of operating a glass furnace according to claim 3, wherein said adjusting step further includes adjusting the vertical angular directions in which said fuel jets are emitted.

5. The method of operating a glass furnace according to claim 4, wherein the directions of said fuel jets are adjusted by moving said burners.

6. The method of operating a glass furnace according to claim 4, wherein at least two pairs of fuel jets are emitted into said melting zone, and wherein the horizontal directions of each pair of jets is adjusted relative to the other pair of jets to increase flame coverage of the glass within the melting zone.

7. The method of operating a glass furnace according to claim 6, wherein the directions of said fuel jets are adjusted by moving said burners.

8. The method of operating a glass furnace according to claim 7, wherein the step of increasing flame coverage is accomplished by turning the turners of each pair toward a side wall of the furnace in increments of about 1° until the flames from burners being turned impinge upon said side wall, and then returning said burners being turned about 1°.

9. The method of operating a glass furnace according to claim 8 wherein the vertical angular direction in which the fuel jets are emitted are adjusted by turning the burners in increments of about 1° toward the furnace wall through which the burners extend until the seed count of the glass from the furnace increases beyond a preselected level, and then returning said burners about 1°.

10. The method of preparing and operating a glass melting furnace for operation, said furnace including burners for admitting at least one pair of fuel jets into a melting zone of the furnace for mixture with air which is fed into the melting zone through air ports, comprising introducing pure oxygen into said melting zone through said air ports, incrementally adjusting the directions in which said fuel jets are emitted with respect to the air flowing through said ports, measuring the amounts of excess air and carbon monoxide in the flue gases from the furnace after each incremental adjustment of said fuel jets, monitoring the quality of the glass pulled from the furnace, and continuing to adjust incrementally the directions of said fuel jets until said excess air has been minimized with the level of carbon monoxide being maintained below a preselected level while maintaining acceptable glass quality, to thereby increase the mixing of fuel from the burners with air flowing through said air ports.

11. The method of preparing and operating a glass furnace according to claim 10, wherein said adjusting step further includes adjusting the vertical angular directions in which said fuel jets are emitted.

12. The method of preparing and operating a glass furnace according to claim 10, wherein said oxygen is introduced through at least one of said burners.

13. The method of preparing and operating a glass furnace according to claim 10, wherein said oxygen is introduced coaxially through at least one of said burners.

14. The method of preparing and operating a glass melting furnace according to claim 10, wherein oxygen is not introduced into said furnace until the fuel flow has been established and wherein the flow of oxygen is interrupted prior to interruption of the fuel flow during operation of the furnace.

15. The method of preparing and operating a glass melting furnace according to claim 10, wherein the momentums of the fuel and oxygen fed into said melting zone are approximately equal.

16. The method of preparing and operating a glass furnace according to claim 10, wherein the directions of said fuel jets are adjusted by moving said burners.

17. The method of preparing and operating a glass furnace according to claim 10, wherein at least two pairs of fuel jets are emitted into said melting zone, and wherein the horizontal directions of each pair of jets is adjusted relative to the other pair of jets to increase flame coverage of the glass within the melting zone.

18. The method of preparing and operating a glass furnace according to claim 17, wherein the directions of said fuel jets are adjusted by moving said burners.

19. The method of preparing and operating a glass furnace according to claim 18, wherein the step of increasing flame coverage is accomplished by turning the burners of each pair toward a side wall of the furnace in increments of about 1° until the flames from burners being turned impinge upon said side wall, and then returning said burners being turned about 1°.

20. The method of preparing and operating a glass furnace according to claim 19, wherein the vertical angular direction in which the fuel jets are emitted are adjusted by turning the burners in increments of about 1° toward the furnace wall through which the burners extend until the seed count of the glass from the furnace increases beyond a preselected level, and then returning said burners about 1°.

* * * * *